(12) United States Patent
Lo

(10) Patent No.: US 11,169,015 B2
(45) Date of Patent: Nov. 9, 2021

(54) LIQUID LEVEL SENSOR AND METHOD FOR SENSING LIQUID LEVEL

(71) Applicant: Chih-Hsuan Lo, Hsinchu (TW)

(72) Inventor: Chih-Hsuan Lo, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 22 days.

(21) Appl. No.: 16/787,046

(22) Filed: Feb. 11, 2020

(65) Prior Publication Data

US 2021/0207989 A1 Jul. 8, 2021

(30) Foreign Application Priority Data

Jan. 6, 2020 (TW) ................................. 109100281

(51) Int. Cl.
*G01F 23/26* (2006.01)

(52) U.S. Cl.
CPC .......... *G01F 23/266* (2013.01); *G01F 23/265* (2013.01)

(58) Field of Classification Search
CPC ...................... G01F 23/26–268; G01F 25/0061
See application file for complete search history.

(56) References Cited

U.S. PATENT DOCUMENTS

| 7,219,545 | B2 | 5/2007 | Salzmann et al. |
| 9,903,748 | B1 * | 2/2018 | Lo .......................... G01F 23/268 |
| 2016/0041024 | A1 * | 2/2016 | Reimer ............... G01F 23/2962 |
| | | | 73/290 V |
| 2019/0186978 | A1 * | 6/2019 | Rondano ............. G01F 25/0061 |

FOREIGN PATENT DOCUMENTS

| CN | 204346543 | 5/2015 |
| TW | 201314184 | 4/2013 |

* cited by examiner

*Primary Examiner* — Justin N Olamit
(74) *Attorney, Agent, or Firm* — JCIPRNET

(57) ABSTRACT

A liquid level sensor and a method for sensing a liquid level adapted to a liquid storage container are provided. The liquid level sensor includes a plurality of sensing electrodes and a liquid level determination circuit. The sensing electrodes are disposed on a side wall of the liquid storage container and correspond to different liquid levels. The liquid level determination circuit is coupled to the sensing electrodes and stores a plurality of capacitance reference values and a plurality of capacitance threshold values in response to a tuning command received from a host during factory calibration. The capacitance reference values are locked after the factory calibration. After the factory calibration, the liquid level determination circuit scans capacitance values of the sensing electrodes to determine a liquid level of a liquid in the liquid storage container based on current capacitance values of the sensing electrodes.

13 Claims, 2 Drawing Sheets

LIQUID LEVEL SENSOR AND METHOD FOR SENSING LIQUID LEVEL

CROSS-REFERENCE TO RELATED APPLICATION

This application claims the priority benefit of Taiwan application serial no. 109100281, filed on Jan. 6, 2020. The entirety of the above-mentioned patent application is hereby incorporated by reference here and made a part of this specification.

BACKGROUND

Technical Field

The disclosure relates to a sensor; more particularly, the disclosure relates to a liquid level sensor and a method for sensing a liquid level.

Description of Related Art

Among home appliances, if a liquid level display function is needed (for instance, in a washing machine, a water dispenser, a pumping motor, or the like), a floating ball or a glass tube marked with a scale is often used to display an internal water level. When a liquid level is measured by applying said mechanisms in the home appliances, the volume of the mechanisms can only be reduced to a limited degree, and as a result, the overall volume cannot be lighter and thinner. Therefore, how to make the liquid level measurement apparatus lighter and thinner has become a subject to modern home appliances.

SUMMARY

The disclosure provides a liquid level sensor with a small-volume measurement structure for achieving a light and thin liquid level sensor and a method for sensing a liquid level.

In an embodiment of the disclosure, a liquid level sensor adapted to a liquid storage container includes a plurality of sensing electrodes and a liquid level determination circuit. The sensing electrodes are disposed on a side wall of the liquid storage container and correspond to different liquid levels. The liquid level determination circuit is coupled to the sensing electrodes and scans capacitance values of the sensing electrodes to determine a liquid level of a liquid in the liquid storage container based on current capacitance values of the sensing electrodes. The liquid level determination circuit stores a plurality of capacitance reference values and a plurality of capacitance threshold values in response to a tuning command received from a host during factory calibration, the capacitance reference values and the capacitance threshold values respectively correspond to the sensing electrodes, and the capacitance reference values are locked after the factory calibration. After the factory calibration, the liquid level determination circuit calculates capacitance variation values of the sensing electrodes based on the current capacitance values of the sensing electrodes and the capacitance reference values, and when the capacitance variation value of each of the sensing electrodes is greater than or equal to the corresponding capacitance threshold value, the liquid level of the liquid is deemed greater than or equal to each of the liquid levels corresponding to the sensing electrodes.

In an embodiment of the disclosure, a method for sensing a liquid level includes following steps. A plurality of sensing electrodes are provided and disposed on a side wall of a liquid storage container, wherein the sensing electrodes correspond to different liquid levels. A plurality of capacitance reference values and a plurality of capacitance threshold values are stored through a liquid level determination circuit in response to a tuning command received from a host during factory calibration, the capacitance reference values and the capacitance threshold values respectively correspond to the sensing electrodes, and the capacitance reference values are locked after the factory calibration. After the factory calibration, capacitance values of the sensing electrodes are scanned through the liquid level determination circuit to determine a liquid level of a liquid in the liquid storage container according to current capacitance values of the sensing electrodes.

In view of the foregoing, in the liquid level sensor and the method for sensing the liquid level as provided in one or more embodiments of the disclosure, the liquid level of the liquid is sensed through the sensing electrodes, and therefore the liquid level of the liquid may be determined even when the space occupied by the liquid level sensor is small.

To make the aforementioned and other features of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
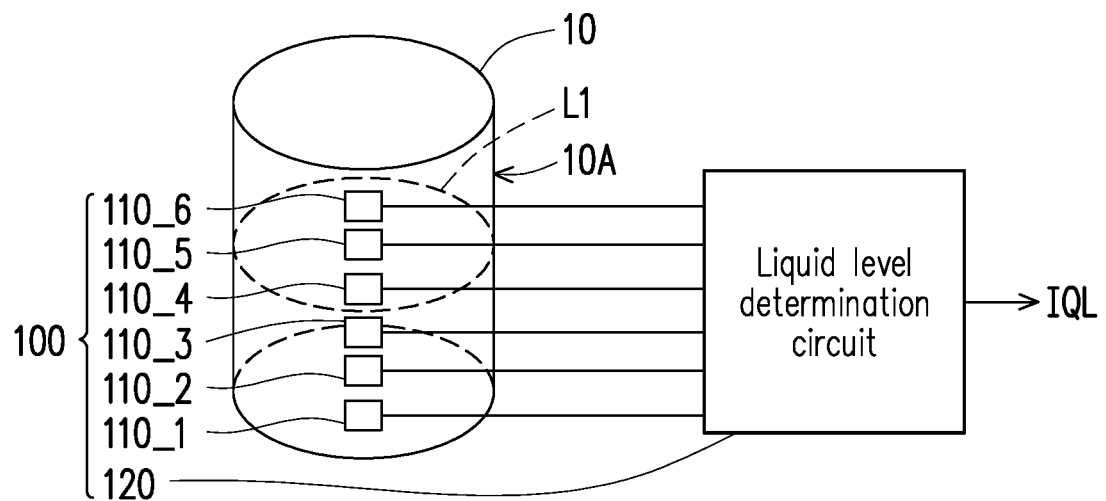
FIG. 1 is a schematic system diagram of a liquid level sensor according to an embodiment of the disclosure.

FIG. 1 is a schematic system diagram of a liquid level sensor according to an embodiment of the disclosure. With reference to FIG. 1, in this embodiment, a liquid level sensor 100 is adapted to a liquid storage container 10 and includes a plurality of sensing electrodes 110_1-110_6 and a liquid level determination circuit 120. The sensing electrodes 110_1-110_6 are disposed on a side wall 10A of the liquid storage container 10 and correspond to different liquid levels, wherein the sensing electrodes 110_1-110_6 may be disposed on an inner surface or an outer surface of the side wall 10A, which may be determined according to circuit design. With reference to the illustration, the liquid levels corresponding to the sensing electrodes 110_1-110_6 are, for instance, from low to high, and a resolution of each liquid level is determined according to the number and patterns of the sensing electrodes 110_1-110_6. Here, the number and the patterns of the sensing electrodes 110_1-110_6 are illustrated as an example.

The liquid level determination circuit 120 is coupled to the sensing electrodes 110_1-110_6 and scans capacitance values of the sensing electrodes 110_1-1106, so as to determine a liquid level (as presented by L1) of a liquid in the liquid storage container 10 based on current capacitance values of the sensing electrodes 110_1-110_6, and provides liquid level information IQL according to the liquid level (as presented in L1) of the liquid.

Furthermore, as being operated in the same way as a capacitive touch module, the liquid in the liquid storage container 10 affects the capacitance value of each of the sensing electrodes 110_1-110_6. When the liquid level (as presented by L1) of the liquid rises and contacts each of the sensing electrodes 110_1-110_6, the capacitance value of each of the sensing electrodes 110_1-110_6 rises corresponding to a submerged ratio. When the capacitance value of each of the sensing electrodes 110_1-110_6 rises by a certain amount, it indicates that the liquid level (as presented by L1) of the liquid is greater than or equal to each of the liquid levels corresponding to the sensing electrodes 110_1-110_6.

In other words, the liquid level determination circuit 120 stores a plurality of capacitance reference values and a plurality of capacitance threshold values during factory calibration, and each of the sensing electrodes 110_1-110_6 corresponds to a capacitance reference value and a capacitance threshold value; namely, each of the sensing electrodes 110_1-110_6 has an initial capacitance value. Next, after the factory calibration, the liquid level determination circuit 120 calculates capacitance variation values of the sensing electrodes 110_1-110_6 according to the current capacitance values of the sensing electrodes 110_1-110_6 and the capacitance reference values. When the capacitance variation value of each of the sensing electrodes sensing electrodes 110_1-110_6 is greater than or equal to the corresponding capacitance threshold value, it indicates the liquid level (as presented by L1) of the liquid is greater than or equal to each of the liquid levels corresponding to the respective sensing electrodes 110_1-110_6.

In view of changes to the environment, according to a capacitance sensing method provided in the related art, the capacitance reference values of the sensing electrodes (e.g., 110_1-110_6) are calibrated when the touch points are being scanned. However, when the capacitance reference values of the sensing electrodes are calibrated at any time, the liquid level determination circuit 120 may fail to determine the liquid level (as presented by L1) of the liquid.

In this embodiment, in order to avoid the issue caused by the calibration of the capacitance reference values of the sensing electrodes at any time, the capacitance reference values of the liquid level determination circuit 120 are set during factory calibration and locked after the setting is completed. Namely, the capacitance reference values cannot be changed by a user and will not be recalibrated outside the factory. In other words, the operation manner of the liquid level determination circuit 120 is actually different from that of a conventional capacitive touch module. As such, given that there is no liquid in the liquid storage container 10, when the liquid storage container 10 is powered on, and a liquid is then introduced into the liquid storage container 10, the liquid level sensor 100 is capable of normally sensing a liquid level of the liquid. Alternatively, given that there is a liquid in the liquid storage container 10, when the liquid level sensor 100 is powered on, the liquid level sensor 100 is able to determine a current liquid level of the liquid and continues the normal operation.

In detail, the calibration operation of the liquid level sensor 100 pertains to the calibration and setting operations performed on the liquid level sensor 100 in the factory before manufacture and shipment. The calibration operation includes following steps. After the liquid level sensor 100 is assembled, a tuning command is issued to the liquid level determination circuit 120 of the liquid level sensor 100 by a host (e.g., a work station) to perform environment calibration (empty field) before manufacture and shipment, and then the liquid level determination circuit 120 records current environment parameter settings (e.g., a plurality of capacitance reference values) in response to the tuning command. Finally, the environmental parameter settings are filled back into the liquid level determination circuit 120 of the liquid level sensor 100 (e.g., a liquid storage device in the level determination circuit 120). As the assembly of each liquid level sensor 100 varies, the environment parameter settings pertain to environment variable difference of each liquid level sensor 100. After the environment calibration is completed, each of the liquid levels corresponding to the respective sensing electrodes 110_1-110_6 in the liquid level sensor 100 may be individually set through the software, so as to determine the capacitance threshold values corresponding the respective sensing electrodes 110_1-110_6. Here, the calibration operation on the liquid level sensor 100 is performed at the factory side and will not be performed in the normal operation environment. That is, the capacitance reference values and the capacitance threshold values corresponding to the respective sensing electrodes 110_1-110_6 are set and adjusted during the factory calibration and are locked after the factory calibration.

In an embodiment of the disclosure, the liquid level determination circuit 120 performs an automatic adjustment function in response to the tuning command, and the automatic adjustment function drives the liquid level determination circuit 120 to scan the sensing electrodes 110_1-110_6 to obtain capacitance reference values corresponding to the respective sensing electrodes 110_1-110_6. After the capacitance reference values are obtained, the liquid level determination circuit 120 stops performing the automatic adjustment function. After the automatic adjustment function is stopped, the liquid level determination circuit 120 stores the capacitance reference values corresponding to the respective sensing electrodes 110_1-110_6. In addition, after the capacitance reference values are stored, the liquid level determination circuit 120 may notify the host to receive a plurality of capacitance displacement values from the host, and a sum of each of the capacitance reference values and a corresponding one of the capacitance displacement values is indicated as the capacitance threshold value of the corresponding one of the sensing electrodes.

In an embodiment of the disclosure, the liquid level determination circuit 120 may continue to compare capacitance variation values of all of the sensing electrodes 110_1-110_6 with the corresponding capacitance threshold values; alternatively, the liquid level determination circuit 120 may stop scanning after comparing the capacitance variation values of all of the sensing electrodes 110_1-110_6 with the corresponding capacitance threshold values during a scan period; alternatively, during a scan period, the liquid level determination circuit 120 compares the capacitance variation values of the sensing electrodes 110_1-110_6 with the corresponding capacitance threshold values from a low liquid level to a high liquid level of the liquid levels, and when one of the capacitance variation values of the sensing electrodes 110_1-110_6 is less than the corresponding capacitance threshold value, the liquid level determination circuit 120 may stop scanning; alternatively, during a scan period, the liquid level determination circuit 120 compares the capacitance variation values of the sensing electrodes 110_1-110_6 with the corresponding capacitance threshold values from the high liquid level to the low liquid level, and when one of the capacitance variation values of the sensing electrodes 110_1-110_6 is greater than or equal to the corresponding capacitance threshold value, the liquid level determination circuit 120 may stop scanning. Here, the scan periods may be adjacent or non-adjacent in the time sequence, which is determined according to the circuit design and should not be construed as a limitation in the disclosure.

Based on the above, the liquid level of the liquid is sensed by the sensing electrodes 110_1-110_6. Namely, the liquid level of the liquid can be determined even when less space is occupied by the liquid level sensor 100, and the sensed information is fed back for further interpretation in order to cope with related program setting operations. In addition, all related functions may be integrated in one chip to completely replace the conventional liquid level sensing method and prevent issues caused by applying the capacitive sensing method to sense the liquid level, so as to satisfy sensing demands for a plurality of liquid levels.

Figure 2:
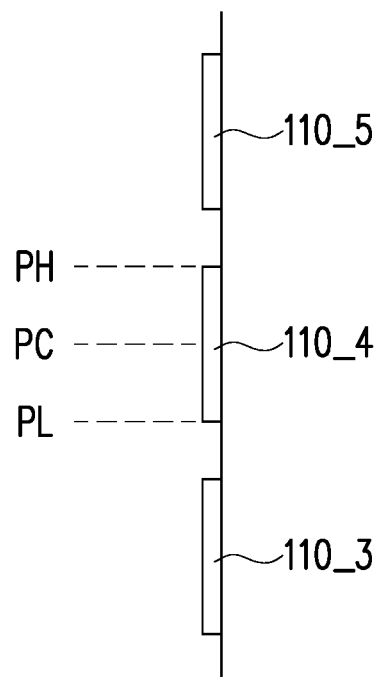
FIG. 2 illustrates a relative relationship between liquid levels and sensing electrodes according to an embodiment of the disclosure.

FIG. 2 illustrates a relative relationship between liquid levels and sensing electrodes according to an embodiment of the disclosure. With reference to FIG. 1 and FIG. 2, in an embodiment of the disclosure, the capacitance displacement values corresponding to the respective sensing electrodes 110_1-110_6 reflect a contact state between the liquid levels (e.g., L1) and the corresponding sensing electrodes 110_1-110_6. For instance, the contact state includes a lowest point (e.g., PL) where the liquid level (e.g., L1) contacts the corresponding sensing electrode (e.g., 110_4), an intermediate point (e.g., PC) where the liquid level (e.g., L1) contacts the corresponding sensing electrode (e.g., 110_4), and a highest point (e.g., PH) where the liquid level (e.g., L1) contacts the corresponding sensing electrode (e.g., 110_4).

In an embodiment of the disclosure, each of the sensing electrodes 110_1-110_6 may correspond to a plurality of capacitance displacement values (i.e., corresponding to a plurality of capacitance threshold values), so as to determine whether the liquid level (e.g., L1) contacts or approaches the lowest point (e.g., PL), the intermediate point (e.g., PC), or the highest point (e.g., PH) of the corresponding sensing electrode (e.g., 110_4), whereby the resolution of the liquid level detection may be improved.

Figure 3:
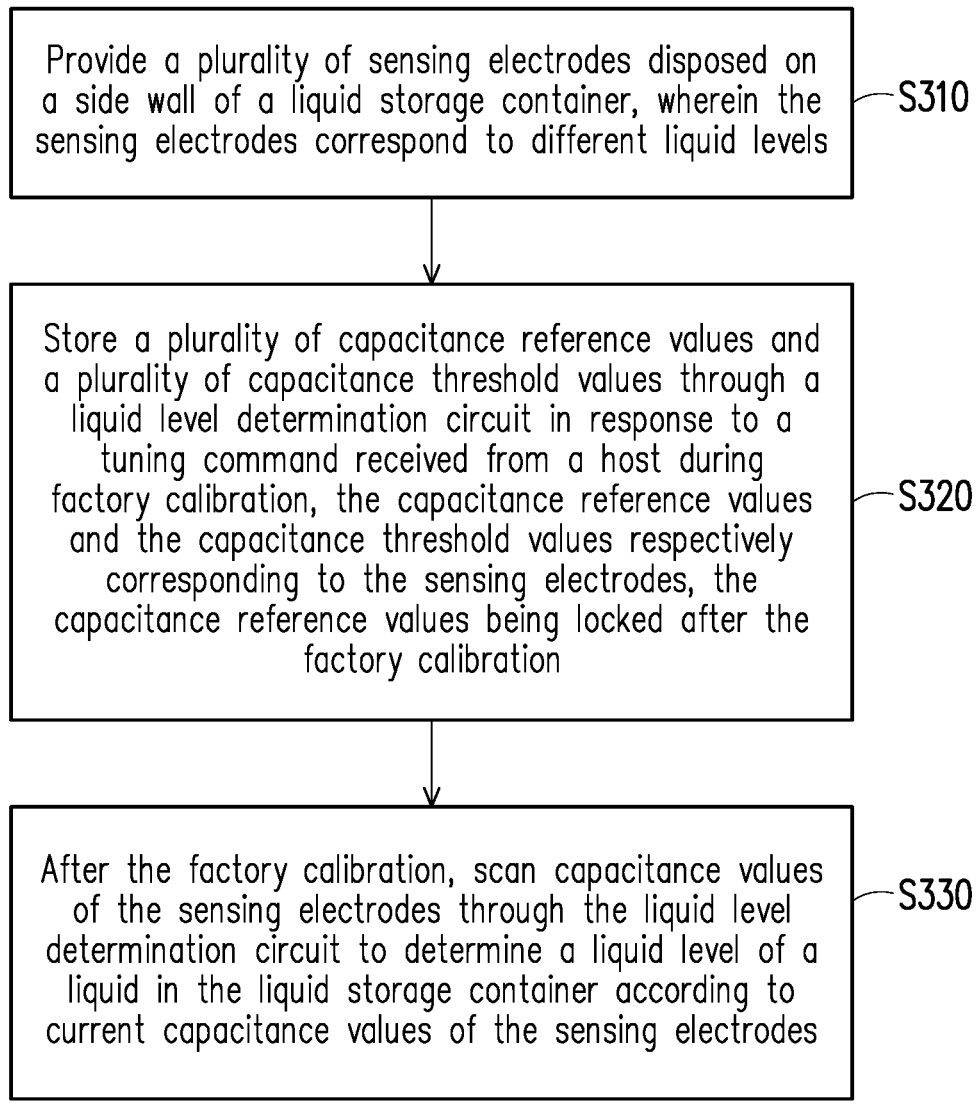
FIG. 3 is a flowchart of a method for sensing a liquid level according to an embodiment of the disclosure.

FIG. 3 is a flowchart of a method for sensing a liquid level according to an embodiment of the disclosure. With reference to FIG. 3, in this embodiment, the method for sensing the liquid level includes following steps. In step S310, a plurality of sensing electrodes are provided and disposed on a side wall of a liquid storage container, wherein the sensing electrodes correspond to different liquid levels. In step S320, a plurality of capacitance reference values and a plurality of capacitance threshold values are stored through a liquid level determination circuit in response to a tuning command received from a host during factory calibration; the capacitance reference values and the capacitance threshold values respectively correspond to the sensing electrodes, and the capacitance reference values are locked after the factory calibration. In step S330, capacitance values of the sensing electrodes are scanned through the liquid level determination circuit to determine a liquid level of a liquid in the liquid storage container according to current capacitance values of the sensing electrodes. The order of performing the steps S310, S320, and S330 provided herein is explanatory and should not be construed as a limitation in the disclosure. In addition, the details of the steps S310, S320, and S330 may be referred to as those provided in the embodiments depicted in FIG. 1 and FIG. 2 and thus are no longer described hereinafter.

To sum up, in the liquid level sensor and the method for sensing the liquid level of the disclosure as provided in one or more embodiments of the disclosure, the liquid level of the liquid is sensed through the sensing electrodes, and therefore the liquid level of the liquid may be determined even when the space occupied by the liquid level sensor is small. In addition, after the capacitance reference values of the liquid level determination circuit are set at the factory, the capacitance reference values are locked to avoid issues caused by applying the conventional capacitance sensing method to the liquid level detection.

Although the disclosure has been described with reference to the above embodiments, the embodiments are not intended to limit the disclosure. A person of ordinary skill in the art may make variations and improvements without departing from the spirit and scope of the disclosure. In view of the foregoing, it is intended that the disclosure covers modifications and variations provided that they fall within the scope of the following claims and their equivalents.

What is claimed is:
1. A liquid level sensor, adapted to a liquid storage container and comprising:
   a plurality of sensing electrodes, disposed on a side wall of the liquid storage container and corresponding to different liquid levels; and
   a liquid level determination circuit, coupled to the sensing electrodes and scanning capacitance values of the sensing electrodes to determine a liquid level of a liquid in the liquid storage container according to current capacitance values of the sensing electrodes,
   wherein the liquid level determination circuit stores a plurality of capacitance reference values and a plurality of capacitance threshold values in response to a tuning command received from a host during factory calibration, the capacitance reference values and the capacitance threshold values respectively correspond to the sensing electrodes, the capacitance reference values are locked after the factory calibration,
   after the factory calibration, the liquid level determination circuit calculates capacitance variation values of the sensing electrodes based on the current capacitance values of the sensing electrodes and the capacitance reference values, and when the capacitance variation value of each of the sensing electrodes is greater than or equal to the corresponding capacitance threshold value, the liquid level of the liquid is deemed greater than or equal to each of the liquid levels corresponding to the sensing electrodes,
   wherein the liquid level determination circuit performs an automatic adjustment function in response to the tuning command to drive the liquid level determination circuit to scan the sensing electrodes, so as to obtain the capacitance reference values, and stops performing the automatic adjustment function after obtaining the capacitance reference values,
   after the automatic adjustment function is stopped, the liquid level determination circuit stores the capacitance reference values, receives a plurality of capacitor displacement values from the host, and indicates a sum of each of the capacitance reference values and a corresponding one of the capacitance displacement values as the capacitance threshold value of the corresponding one of the sensing electrodes.

2. The liquid level sensor according to claim 1, wherein the capacitor displacement values individually reflect a contact state between the liquid levels and the corresponding sensing electrodes.

3. The liquid level sensor according to claim 2, wherein the contact state comprises a lowest point, an intermediate point, and a highest point where the liquid levels contact the corresponding sensing electrodes.

4. The liquid level sensor according to claim 1, wherein the liquid level determination circuit compares the capacitance variation values of the sensing electrodes with the corresponding capacitance threshold values during a scan period.

5. The liquid level sensor according to claim 1, wherein the liquid level determination circuit in a scan period compares the capacitance variation values of the sensing electrodes with the corresponding capacitance threshold values from a low liquid level to a high liquid level of the liquid levels.

6. The liquid level sensor according to claim 1, wherein the liquid level determination circuit in a scan period compares the capacitance variation values of the sensing electrodes with the corresponding capacitance threshold values from a high liquid level to a low liquid level of the liquid levels.

7. A method for sensing a liquid level, the method comprising:
   providing a plurality of sensing electrodes disposed on a side wall of a liquid storage container, wherein the sensing electrodes correspond to different liquid levels;
   storing a plurality of capacitance reference values and a plurality of capacitance threshold values through a liquid level determination circuit in response to a tuning command received from a host during factory calibration, the capacitance reference values and the capacitance threshold values respectively corresponding to the sensing electrodes, the capacitance reference values being locked after the factory calibration; and
   after the factory calibration, scanning capacitance values of the sensing electrodes through the liquid level determination circuit to determine a liquid level of a liquid in the liquid storage container according to current capacitance values of the sensing electrodes,
   wherein the step of storing the capacitance reference values and the capacitance threshold values through the liquid level determination circuit in response to the tuning command received from the host during the factory calibration comprises:
      performing an automatic adjustment function through the liquid level determination circuit in response to the tuning command to drive the liquid level determination circuit to scan the sensing electrodes, so as to obtain the capacitance reference values, and stopping performing the automatic adjustment function after obtaining the capacitance reference values; and
      after the automatic adjustment function is stopped, storing the capacitance reference values with the liquid level determination circuit, receiving a plurality of capacitor displacement values from the host, and indicating a sum of each of the capacitance reference values and a corresponding one of the capacitance displacement values as the capacitance threshold value of the corresponding one of the sensing electrodes.

8. The method for sensing the liquid level according to claim 7, wherein the capacitor displacement values individually reflect a contact state between the liquid levels and the corresponding sensing electrodes.

9. The method for sensing the liquid level according to claim 8, wherein the contact state comprises a lowest point, an intermediate point, and a highest point where the liquid levels contact the corresponding sensing electrodes.

10. The method for sensing the liquid level according to claim 7, wherein the step of storing the capacitance reference values and the capacitance threshold values through the liquid level determination circuit in response through the liquid level determination circuit to determine the liquid level of the liquid in the liquid storage container according to the current capacitance values of the sensing electrodes comprises:
   calculating capacitance variation values of the sensing electrodes based on the current capacitance values of the sensing electrodes and the capacitance reference values;
   comparing the capacitance variation values of the sensing electrodes with the corresponding capacitance threshold values;
   indicating that the liquid level of the liquid is greater than or equal to each of the liquid levels corresponding to the sensing electrodes when the capacitance variation value of each of the sensing electrodes is greater than or equal to the corresponding capacitance threshold value; and
   indicating that the liquid level of the liquid is less than each of the liquid levels corresponding to the sensing electrodes when the capacitance variation value of each of the sensing electrodes is smaller than the corresponding capacitance threshold value.

11. The method for sensing the liquid level according to claim 7, further comprising:
   during a scan period, comparing the capacitance variation values of the sensing electrodes with the corresponding capacitance threshold values and stopping scanning after the comparison is completed.

12. The method for sensing the liquid level according to claim 11, wherein in the scan period the capacitance variation values of the sensing electrodes are compared with the corresponding capacitance threshold values from a low liquid level to a high liquid level of the liquid levels.

13. The method for sensing the liquid level according to claim 11, wherein in the scan period the capacitance variation values of the sensing electrodes are compared with the corresponding capacitance threshold values from a high liquid level to a low liquid level of the liquid levels.

* * * * *